(12) United States Patent
Ningrat (10) Patent No.: US 8,477,116 B2
(45) Date of Patent: *Jul. 2, 2013

(54) MULTIPLE TOUCH LOCATION IN A THREE DIMENSIONAL TOUCH SCREEN SENSOR

(75) Inventor: Kusuma Adi Ningrat, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 93 days.

This patent is subject to a terminal disclaimer.

(21) Appl. No.: 13/159,267

(22) Filed: Jun. 13, 2011

(65) Prior Publication Data

US 2011/0242052 A1 Oct. 6, 2011

Related U.S. Application Data

(63) Continuation of application No. 12/233,350, filed on Sep. 18, 2008, now Pat. No. 7,982,723.

(51) Int. Cl.
*G06F 3/045* (2006.01)
(52) U.S. Cl.
USPC .......................................................... 345/174
(58) Field of Classification Search
USPC .. 345/156–179; 178/18.01–19.07; 341/20–26
See application file for complete search history.

(56) References Cited

U.S. PATENT DOCUMENTS

| | | | |
|---|---|---|---|
| 4,103,252 A | 7/1978 | Bobick | |
| 4,300,127 A | 11/1981 | Bernin | |
| 5,798,750 A | 8/1998 | Ozaki | |
| 5,982,302 A | 11/1999 | Ure | |
| 6,992,601 B2 | 1/2006 | Chiu et al. | |
| 7,986,306 B2 | 7/2011 | Eich et al. | |
| 8,072,429 B2 | 12/2011 | Grivna | |
| 8,284,080 B2 * | 10/2012 | Ng et al. | 341/26 |
| 2003/0132922 A1 | 7/2003 | Philipp | |
| 2006/0227115 A1 | 10/2006 | Fry | |
| 2007/0285440 A1 | 12/2007 | MacInnis et al. | |
| 2008/0048990 A1 | 2/2008 | Cho et al. | |
| 2008/0150906 A1 | 6/2008 | Grivna | |
| 2008/0309490 A1 | 12/2008 | Honkanen et al. | |
| 2010/0019780 A1 | 1/2010 | Bulea | |

OTHER PUBLICATIONS

Australian Patent Office Written Opinion, STMicroelectronics Asia Pacific PTE LTD (SG), Application No. SG 200718899-8, Dec. 8, 2009, pp. 5.
Australian Patent Office 2nd Written Opinion, STMicroelectronics Asia Pacific PTE LTD (SG), Application No. SG 200718899-8, Oct. 6, 2010, pp. 5.
Australian Patent Office Examination Report, STMicroelectronics Asia Pacific PTE LTD (SG), Application No. SG 200718899-8, Jun. 16, 2011, pp. 5.

* cited by examiner

*Primary Examiner* — Rodney Amadiz
(74) *Attorney, Agent, or Firm* — Hogan Lovells US LLP (57) ABSTRACT

A touch screen capable of correctly identifying multiple touches employs multiple active line arrays oriented to provide multi-dimensional data. Three arrays of capacitance based active lines are each distinctly oriented to form a plurality of intersections. A first and second array are generally oriented perpendicularly while a third array is oriented to bisect the resulting matrix such that the active lines of the third array also intersect the existing vertices. As a result of a touch each active line array identifies the location of the touch from three distinct directions. Ambiguity from dual touch scenarios existing in dual array systems is removed by providing an additional reference.

22 Claims, 7 Drawing Sheets

MULTIPLE TOUCH LOCATION IN A THREE DIMENSIONAL TOUCH SCREEN SENSOR

RELATED APPLICATIONS

The present invention claims priority from, and is a continuation application of, U.S. patent application Ser. No. 12/233,350 filed Sep. 18, 2008, and is incorporated herein by reference in its entirety for all purposes as if fully set forth herein.

BACKGROUND OF THE INVENTION

1. Field of the Invention

Embodiments of the present invention relate to touch pads or touch screens and more particularly to multi-dimensional touch pad/screen sensor arrays.

2. Relevant Background

A touch screen or touch pad is a display (interface) that can detect the presence and location of a touch within a specified area. The term "touch" generally refers to contact with the display of the device by a finger or hand. Some touch screens and/or touch pads (used synonymously herein) can also sense passive objects, such as a stylus.

Touch screens encompass a broad range of technology including resistive, surface acoustic wave, capacitive, infrared, strain gage, optical imaging, dispersive signal technology, acoustic pulse recognition, frustrated total internal reflection and diffused laser imaging. Each of these technological approaches to touch screen applications possesses advantages and disadvantages.

A capacitive touch screen includes some type of array or panel that conducts a continuous electrical current across the sensor. The sensor therefore exhibits a precisely controlled field of stored electrons in both the horizontal and vertical axes. Said differently, the sensor array achieves capacitance. The human body is also an electrical device which has stored electrons and therefore also exhibits capacitance. When the sensor's capacitance field (its reference state) is altered by another capacitance field, i.e., someone's finger, electronic circuits measure the resultant change in the characteristics of the reference field and send the information about the event to the controller or central processing unit for mathematical processing. Capacitive touch screens are not affected by outside elements and have high clarity.

Figure 1:
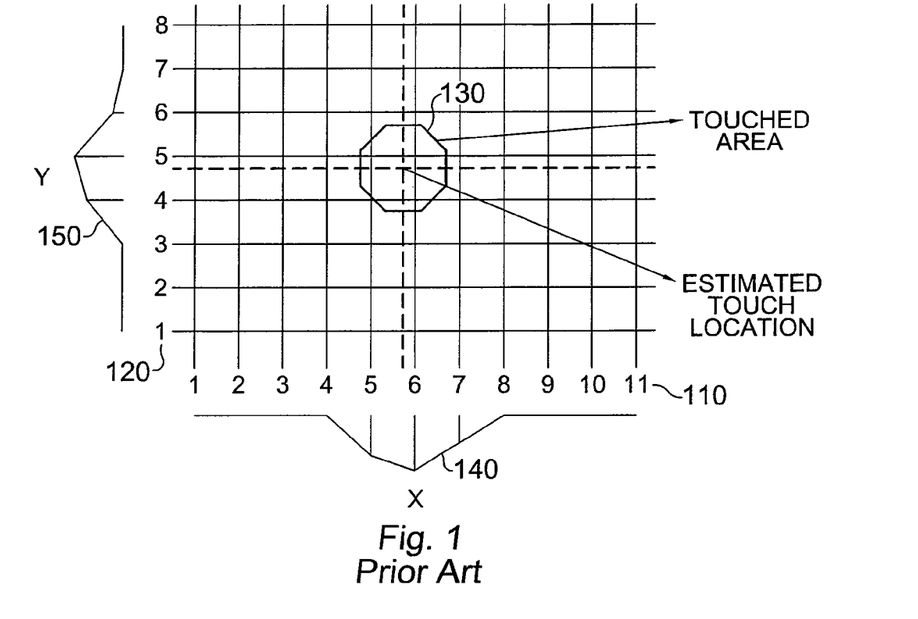
FIG. 1 shows a high level view of a two dimensional capacitance based touch screen showing a single touch as is known in the prior art.

FIG. 1 shows a typical two dimensional touch screen matrix as is known in the prior art. As shown an array of sensors intersects over the applicable area of interest. In this example of touch screen technology, two opposing active line arrays form a matrix or sensor grid. A first array 100 of active lines 1-11 is oriented vertically while a second array 120 of active lines 1-8 is oriented horizontally. An example of a touch 130 is illustrated in the approximate center of the matrix. As described above the capacitance of the sensor array changes from the interaction of a human finger. Sensors in the vicinity of the touch register an increase in the local capacitance level as is indicated by the capacitance histograms 140, 150 adjacent to the X and Y axes of the field, respectively. As shown the touch 130, while possessing an estimated touch location of approximately (5.6, 4.8), shows a capacitance increase on the Y axis beginning at location 3.6 and ending at location 5.6 and on the X axis beginning at approximately location 4.8 and extending to location 6.6. Using these ranges of capacitance variations, an estimated touch location is determined.

Figure 2:
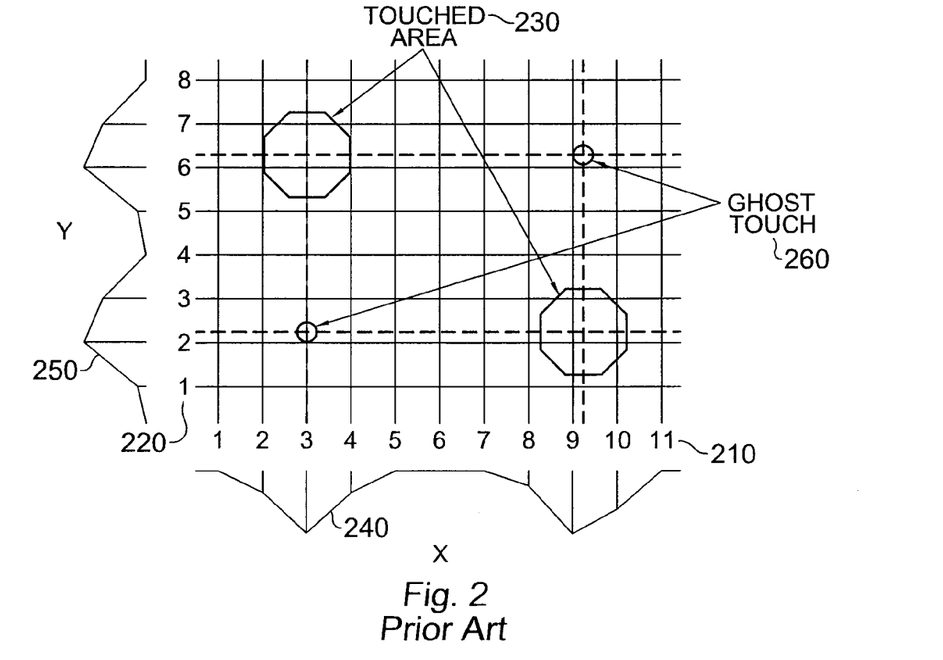
FIG. 2 shows the high level two dimensional capacitance based touch screen of FIG. 1 showing a dual touch scenario as is known in the prior art.

While this type of capacitance matrix or sensor array is capable of accurately determining a single touch on a touch screen, it does not possess the ability to decipher multiple (simultaneous) touches. As with many two dimensional touch screen technologies, multiple touches produce a geometrical multiple number of coordinate combinations. FIG. 2 shows a two dimensional touch screen using a X, Y grid sensor orientation as is known in the prior art. As described previously the touch screen includes a set of sensors 1-11 oriented vertically along the X axis 210 and a set of sensors 1-8 oriented horizontally along the Y axis 220. Histograms representative of capacitance levels on the horizontal array 250 and the vertical array 240 indicate the presence of a touch via raised capacitance levels.

Upon a multiple touch, in this example a dual touch, two actual touch areas 230 are created on the touch screen. At each location the sensors recognize a rise in capacitance levels and register a touch. This type of prior art system, however, can not differentiate between the actual touched areas 230 and two ghost touch areas 260. As shown on the Y axis, the horizontally oriented sensors recognize a touch at approximately (2.2, 6.2). Similarly the vertically oriented sensor array identifies a touch at (3, 9.2). Yet the real touch 230 is located at (3, 6.6) and (9.2, 2.2). The ability to differentiate the coordinates of the real touch from those identifying locations (3, 2.2) and (9.2, 6.2) remains a challenge. Embodiments of the present invention address these and other challenges in the prior art.

SUMMARY OF THE INVENTION

A touch screen capable of and corresponding method for correctly identifying multiple touches is hereafter disclosed. According to one embodiment of the present invention, multiple active line arrays are oriented to provide dimensional data for resolving multiple touches. By adding one or more additional arrays of active lines, incorrect touch coordinates known as ghost touches can be eliminated.

According to one embodiment of the present invention, three arrays of active lines are each distinctly oriented to form a plurality of intersections. A first and second array are generally oriented perpendicularly as is known in the prior art while a third array is oriented to bisect the resulting matrix such that the active lines of the third array also intersect the existing intersections. The resulting plurality of intersections acts as vertices for each of the intersecting arrays. While the sensor arrays exist in a first layer, the contacts for each array are formed in an underlying second layer. As a result of a touch, each active line array identifies the location of the touch from three distinct directions. Ambiguity from dual touch scenarios existing in dual array systems is removed by providing an additional reference. In a similar fashion additional arrays can be oriented to offer additional references for further multiple touch scenarios.

In an exemplary embodiment of a dual touch screen system, three active line arrays are distinctly oriented to provide unique touch coordinates. System capacitance is monitored, and when the total capacitance exceeds a predefined threshold, a touch is indicated. Data from each array is collected identifying active line capacitance peaks. With peaks identified in each array, neighboring lines are combined with the lines possessing capacitance peaks which forms a grouping. Using a weighted average technique, an estimated touch coordinate is determined from the grouping.

From a dual touch scenario each of the three arrays will produce two unique estimated touch locations. Using a mathematical relationship between the array coordinates, false or ghost touch points can be eliminated revealing the actual dual touch locations.

According to another embodiment of the present invention, a touch window is defined surrounding each touch location. When a touch occurs within the window surrounding a previous touch, the subsequent touches are tracked to register touch movement. For example the forming of two lines by dual touches being moved over the touching surface.

According to another embodiment of the present invention, when a location of the touch pad or touch screen is touched cross-capacitance is reduced and measured by sweeping data along the active lines. A distance between active lines of a first, second and third array is such that when a location is touched at least two active lines detect cross-capacitance reduction. A touch is determined by a total capacitance exceeding a threshold. A location of the touch is determined by weighing average capacitance of active lines.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Disclosed herein are descriptive embodiments of a multi-dimensional capacitance based touch screen system, and corresponding method, for definitively resolving instances of multiple simultaneous touches. An embodiment of the present invention distinctly orients multiple active line arrays such that the resulting intersections of the active lines correspond to a plurality of common vertexes. Independent data gathered by each active line array is used to definitively resolve incorrect ghost touches.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Figure 3:
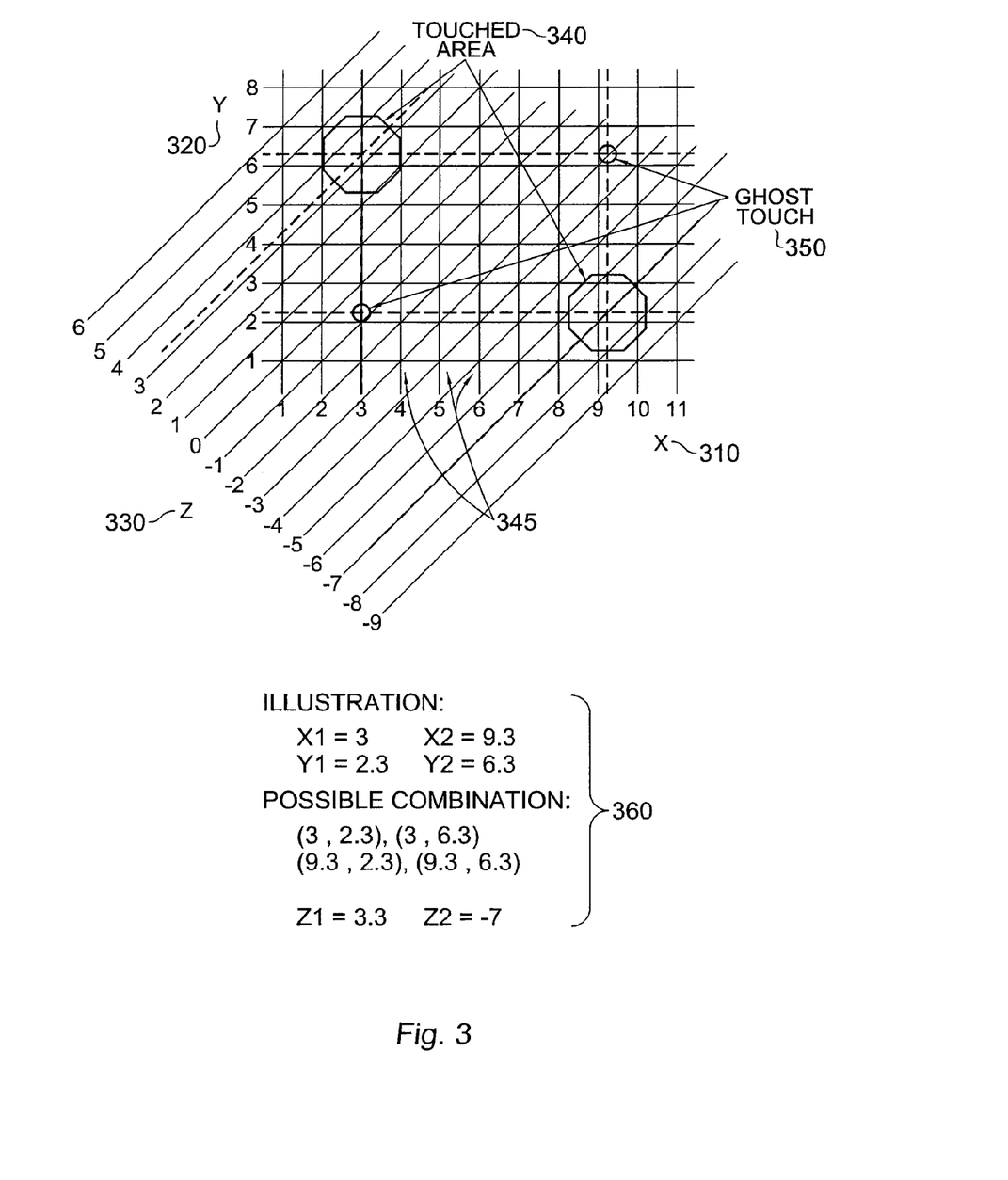
FIG. 3 shows a high level view of a three-dimensional capacitance based touch screen according to one embodiment of the present invention showing a dual touch scenario.

An exemplary embodiment of the present invention is shown in FIG. 3 in which three active line arrays are individually oriented. As shown a first active line array 310 is oriented vertically along the X axis and comprises, for the purpose of this example, active lines 1-11. Similarly a second active line array 320 is horizontally oriented along the Y axis comprising active lines 1-8. Finally a third active line array 330 is oriented about a Z axis comprising lines −9 to +6 for a total of 15 lines. One skilled in the relevant art will recognize that the depiction shown in FIG. 3 is for demonstrative purposes only and that the number of active lines associated with each array, the spacing of the active lines, and the specific orientations of the three arrays may vary in compliance with the description herein. Indeed while the embodiment shown in FIG. 3 depicts three active line arrays to resolve dual touch scenarios, additional arrays implemented within the same touch screen to expand the screen's ability to resolve multiple touch scenarios is also possible. For example four active line arrays can be distinctly oriented to provide data capable of resolving a triple touch.

The touch screen and active line array arrangement of FIG. 3 show the first active line array 310 and the second active line array 320 oriented perpendicular to one another. The resulting mesh of active lines forms a plurality of intersections 345 or vertices for each active line of the two arrays. The third active line array oriented along the Z axis is, in this embodiment of the present invention, positioned to bisect the squares formed by the intersection of the first and second active line array. As can be seen in FIG. 3, each line associated with the third array 330 travels through the vertices (intersections) formed by the intersections of the first active line array 310 and the second active line array 320. Thus each intersection is a star configuration of 6 lines.

As shown in FIG. 3 two touched areas 340 are present indicating a dual touch. As with a dual array system, two ghost touches 350 are also indicated by the possible coordinate combinations shown to the right of the depicted screen 360. From the two touch positions, each array registers an increase in capacitance at two groupings of active lines. From these groupings, through a technique to be subsequently described herein, an estimated touch coordinate is determined for each touch. For example, for the first array 310 associated with the X axis, the estimated touch locations are X equal to 3 and 9.3. Similarly the second array 320 associated with the Y axis yields coordinates 2.3 and 6.3 and the third array 330 associated with the Z axis yields 3.3 and −7.

The presence of the Z coordinates enables the real touch coordinates to be differentiated from the ghost touch coordinates. By using the relationship that the Y coordinate is equal to the X coordinate plus the Z coordinate, the real touch coordinates can be determined. For example recall that a Z coordinate of 3.3 was measured. Using the X coordinate values of 3 and 9.3 yields Y equal to 6.3 and 12.3. Comparing these calculated results to the actual Y measurements finds that the calculation of Y equal to 6.3 correlates to a measured value while the calculated 2.3 does not. Therefore the X, Y combination representing a true, actual touch is X equal to 3 and Y equal to 6.3. In the same manner it can be determined that the other true touch coordinate is (9.3, 2.3).

As one skilled in the art will recognize, the coordinate relationship between the three axes, in this case Y=X+Z, can vary according to the respective orientation of the three or more axes. In addition the present invention enables ranging of values to be used so that a range of actual touch coordinates can be determined. For example a realistic value for X in the previous example is not 3 but 2.7 to 3.3 yielding a Y value of 6 to 6.6.

Figure 4:
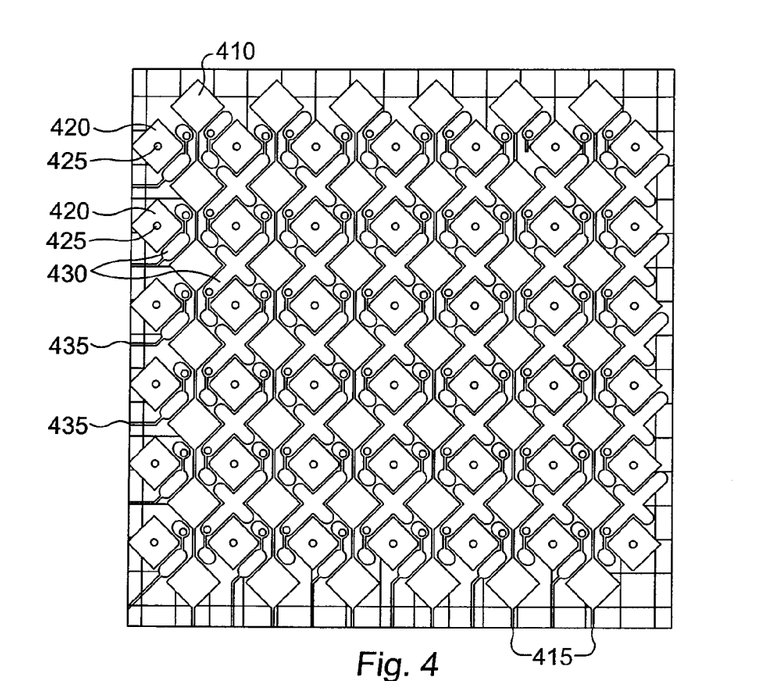
FIG. 4 shows one embodiment of an upper layer sensor pattern for a three-dimensional touch screen according to the present invention.

FIG. 4 is a high level depiction, according to one embodiment of the present invention, of a top layer touch screen comprising three active line sensor arrays. As shown the three interlocking sensor arrays 410, 420, 430 coexist in the top layer of a dual layer touch screen. A set of vertically oriented diamond touch sensors 410 is distributed over the X axis of the touch screen as is a set of horizontally oriented diamond touch sensors 420 distributed over the Y axis. Finally a set of elongated oval touch sensors 430 is distributed along the Z axis (45 degree offset from the X and Y axes).

Each line includes a lead that is used to monitor capacitance in the line. For example the first array includes a plurality of leads 415 along the X axis, the second array includes a plurality of leads 425 along the Y axis, and the third array includes a plurality of leads distributed along the X and Y axes. By pressing down on the touch screen, a number of the sensor array lines establish a connection with contacts in the lower layer that alters the line capacitance.

Figure 5:
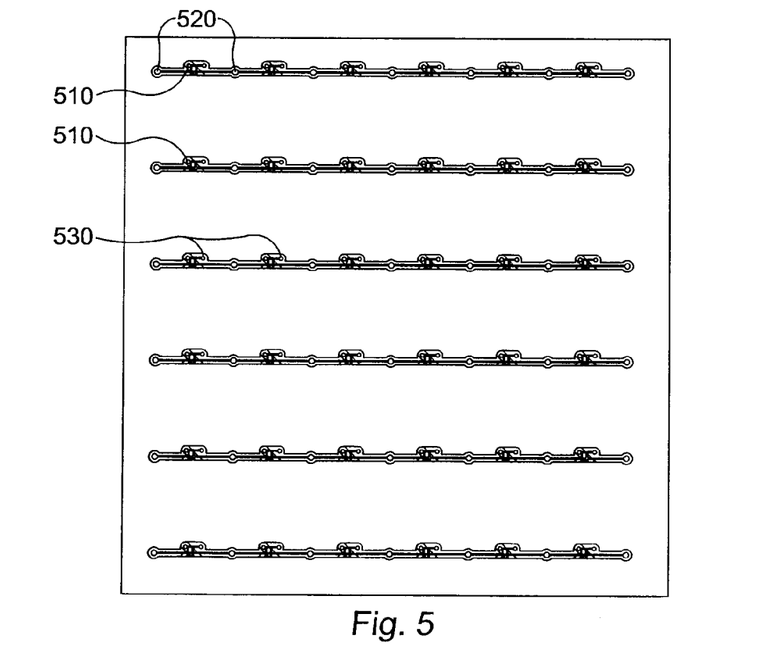
FIG. 5 shows one embodiment of a lower layer contact pattern for a three dimensional touch screen according to the present invention.

FIG. 5 shows a depiction of the lower layer corresponding to the upper layer shown in FIG. 4 of a multi array touch screen, according to one embodiment of the present invention. As shown the lower layer includes a plurality of contact points, 510, 520, 530. Each active line sensor array associated with the upper layer is correspondingly associated with a plurality of contact points present on the lower layer. While the set of contacts shown in FIG. 5 appears to be contiguous, they are in fact a combination of individual contact points associated with each line of each sensor array. In this case, the first array of vertically oriented lines is associated with a set of contacts offset to the left 510 of each intersection while the contact points associated with the third array are offset to the right 530 of each intersection. Finally contact points for the lines associated with the second array 520 are distributed between those associated with the first and second arrays.

Figure 6:
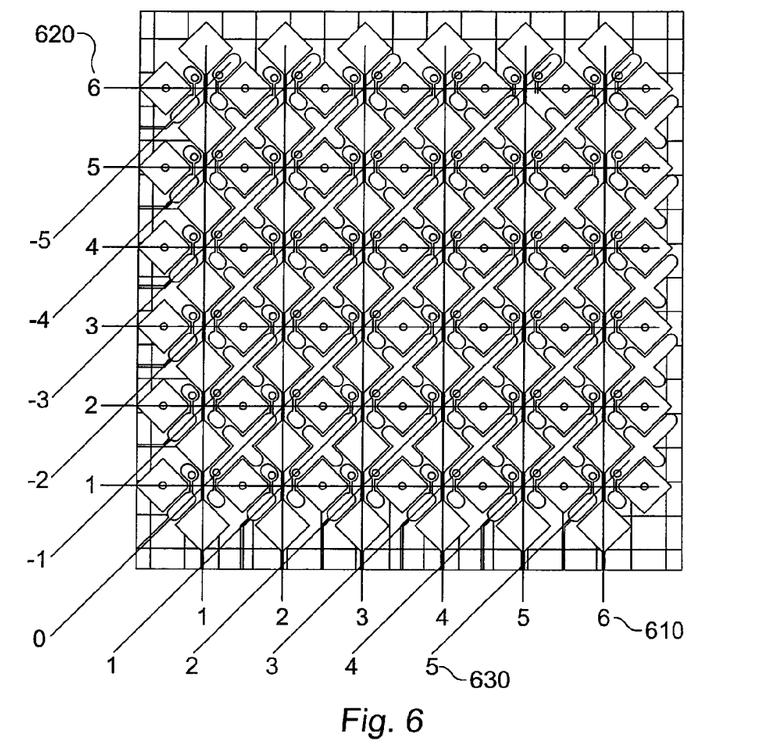
FIG. 6 shows a composite view of a three-dimensional touch screen having multiple upper layer active line sensor arrays and lower layer contact patterns, according to one embodiment of the present invention.

FIG. 6 shows a composite rendering of the upper layer of FIG. 4, the lower layer of FIG. 5 and the array grid of FIG. 3 in a single depiction. This rendering of one embodiment of the present invention illustrates the interaction of the first sensor array 610 and contacts, the second sensor array 620 and contacts, and the third sensor array 630 and contacts.

Figure 7:
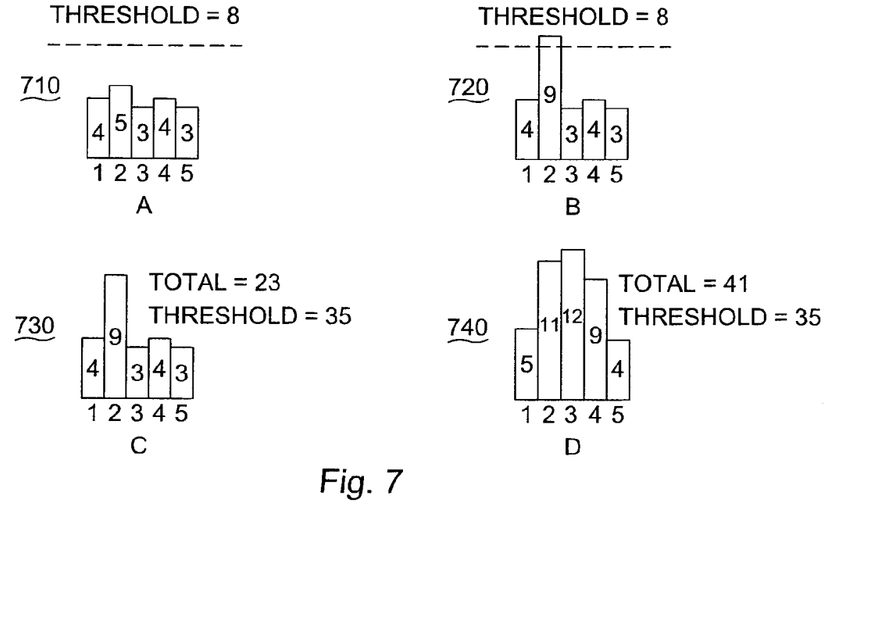
FIG. 7 shows a comparative example of touch detection determination according to one embodiment of the present invention.

The touch screen configuration shown in FIGS. 3-6 illustrates a three dimensional active line array system capable of deciphering between real and ghost touches present when a dual touch situation occurs. According to one embodiment of the present invention, a touch occurs when the total capacitance of the system exceeds a predefined threshold. As will be appreciated by one skilled in the art, touch screens and touch pads are susceptible to noise and other electrical interference that may wrongly indicate that a touch has occurred. One embodiment of the present invention reduces the occurrence of false positive touch indication by monitoring the total capacitance of the system and determining a touch when the entire system capacitance exceeds a predefined level. FIG. 7 shows an illustrative comparison of a touch determination according to one embodiment of the present invention as compared to the methodology of the prior art.

When a capacitive array system is at rest, each line within each array possesses a certain capacitance. As previously discussed, upon a touch occurring on the screen or pad, the capacitance of the lines associated with the touch increases. Illustration A 710 of FIG. 7 shows a simple example of an active line array comprised of 5 lines in a state of rest meaning that no touch is present. Each line has substantially the same capacitance. Previous systems signaled a touch when any of the aforementioned lines would experience a capacitance rise exceeding a certain threshold. For example consider a predefined threshold indicative of a touch of 8. As shown in illustration B 720 of FIG. 7, a capacitance rise of line 2 to the value of 9 would exceed the threshold and be treated as if a touch occurred. Noise or other spurious signals can cause such an isolated yet large capacitance spike yielding false positive indications.

Illustration C 730 of FIG. 7 is identical to illustration B with the exception that rather than using a single line threshold of 8, a total capacitance threshold of 35 is used. According to one embodiment of the present invention, each active line in the array is summarily monitored. When the total capacitance of the system exceeds a predefined threshold, a touch is indicated. As shown in illustration C 730, a local noise spike would not indicate a touch has occurred as the total system capacitance, 23, has not exceeded the threshold of 35. Illustration D 740 presents a real touch situation in which active lines near a local peak all show increases in capacitance levels. Thus the total capacitance for the entire system exceeds a threshold, e.g. 35, to be indicative of a real touch. One skilled in the art will recognize that the predefined threshold is based on several factors consistent with the composition and construction of the touch screen, and while significant in the implementation of the present invention, are not within this invention's scope.

As is implied in FIG. 7, real touch indications from an active line array do not involve a single active line but rather involve multiple lines with multiple capacitance level increases. Once the touch determination has occurred, i.e. the total capacitance of the system has exceeded a predefined threshold, estimates of the actual touch location must be determined.

According to one embodiment of the present invention, the exact location of the estimated touch locations is gained using weighted averages. Weighted averaging is a statistical technique that will be recognized by one skilled in the art of statistical data analysis. Other statistical implementation methodologies can be successfully utilized by multiple active line array touch screens of the present invention. These implementation methodologies are known within the statistical art and the specifics of their application within the context of the present invention will be readily apparent to one of ordinary skill in the relevant art in light of this specification.

Figure 8:
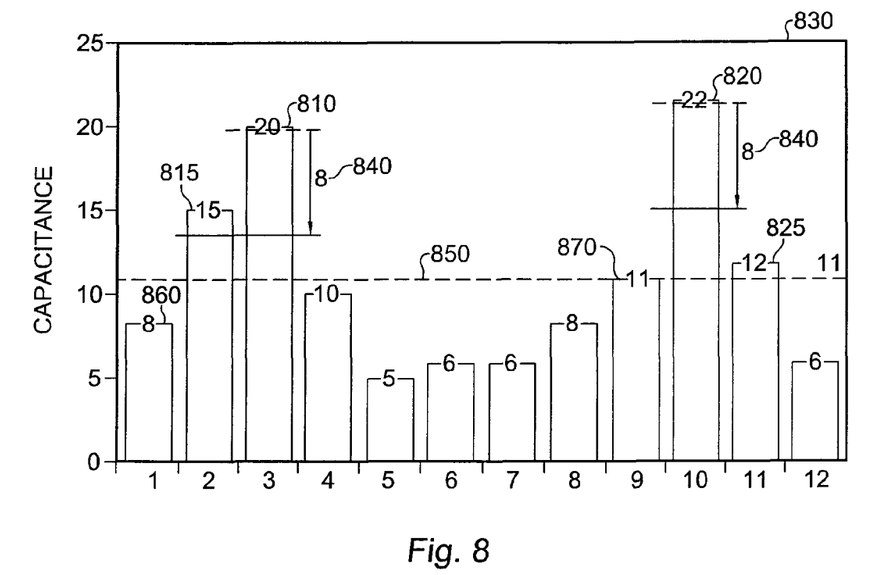
FIG. 8 shows a graphical view of peak capacitance value determination of one exemplary capacitance array indicative of a dual touch scenario according to one embodiment of the present invention.

FIG. 8 shows exemplary capacitance levels of one active line array associated with a touch screen of the present invention in which a dual touch has occurred. In the present example, a touch determination has already occurred and the system has gathered capacitance values to determine estimated touch locations. As previously mentioned with a dual touch scenario, each active line array will have data consistent with two touch locations.

In the present example a local spike in the capacitance levels is found on line 3 and line 10. According to one embodiment of the present invention, a local peak is determined when the capacitance level of one or more lines exceeds a predefined threshold and whose neighboring values are less than its value. In this example a local threshold of 11 850 indicates a peak. Thus lines 3 810 and 10 820 meet the initial criteria of both exceeding the threshold of 11 and having neighboring lines with capacitance values less than their value.

The peak is further defined by determining whether any neighboring lines to the peak are of sufficient magnitude that they should be included within the peak value. Again a threshold level is used to measure from the maximum peak value any other line within a certain capacitance range. In this case a value of 8 is used. Thus the question becomes whether the lines adjacent to line 3, which has a value of 20, have values larger than 12. Line 2 815 possesses a value of 15 and thus qualifies to be included as part of the peak channel. Line 4 850 has a value of 10 and thus does not qualify to be included as part of the peak channel.

Line 10 820, the other local peak, has a value of 22. Using the same peak channel criteria any adjacent channel having more than 14 would be considered part of this peak channel. Line 9 870 has a value of 11 and would thus not be included as part of the peak channel. Similarly line 11 825 with a value of 12 would not be considered part of the peak channel. Note that line 11 825 singularly exceeds the initial threshold value for a peak, and, but for the fact that line 10 820 has a value exceeding that of line 11 825, it could have been a local peak.

With the peak channels determined to be lines 2 and 3 for a first peak channel and line 10 for the second, a peak grouping can be formed. According to one embodiment of the present invention, a peak grouping includes the lines comprising the peak channel and any adjacent lines. Thus the first peak grouping includes line numbers 1, 2, 3, and 4 and the second grouping includes line numbers 9, 10, and 11.

Using the relationship, $$Loc = \frac{\sum_{x}^{N} n * Cap_n}{\sum_{x}^{N} Cap_n},$$

the exact location of a touch group is determined. In the above referenced equation Loc is the estimated coordinate location in terms of the line numbers. Cap is the capacitance for a particular line thus the capacitance for line 1, $Cap_1$, is 8. The symbol n is the line number while N is the number of lines within the peak group. For the peak groupings of the example presented in FIG. 8, the estimated touch location is 2.55 and 10.02.

In the same manner estimate touch locations can be determined for each array as the result of a touch determination. Thus for a system having three active line arrays a total of six estimated touch location coordinates will be determined. From those coordinates, using techniques previously mentioned, actual touch locations can be determined as distinguished from ghost locations.

Figure 9:
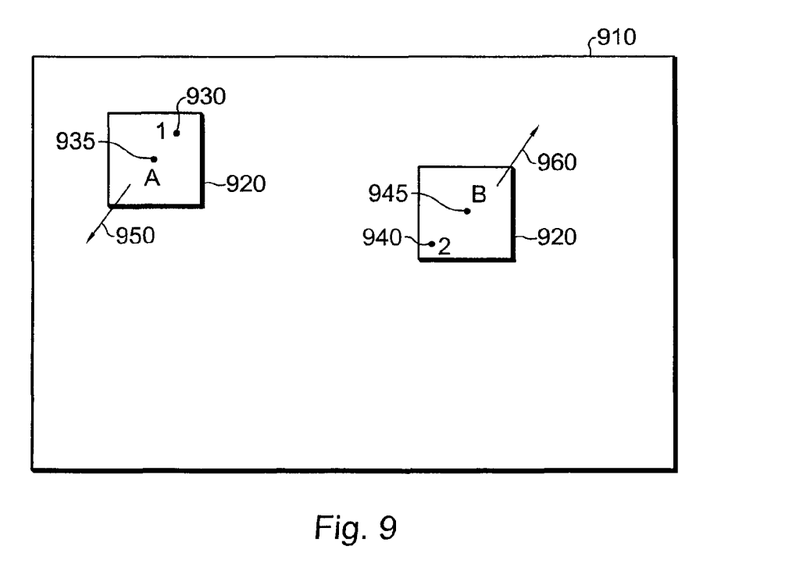
FIG. 9 shows a dual touch scenario having tracking windows to identify touch movement according to one embodiment of the present invention.

According to another embodiment of the present invention, moving dual touch locations can be tracked by considering a window surrounding each touch location. FIG. 9 shows a dual touch scenario having tracking windows to identify touch movement according to one embodiment of the present invention. Within a touch screen 910 two touches have occurred at position 1 930 and position 2 940. Surrounding each touch location is a window 920. The size of the window can be variable based on the needs of the user or the system's desire to track or associate subsequent touches with previous touches.

The windows 920 surrounding each point exist for a certain period of time. Again the time delay of the window can be set based on user needs. Within the period of susceptibility, the system examines whether a new touch has occurred within the window 920. Thus each touch determination is stored and compared to each subsequent touch location. When the new touch is within an active window surrounding a subsequent touch, touch tracking is invoked. In this case previous touches 1 930 and 2 940 are stored in memory. An active window 920 of a predetermined size surrounds the touch for a predetermined period of time. During that period of time a new, second touch occurs. With respect to touch 1 930, touch A 935 occurs. Similarly with respect to touch 2 940, touch B 945 occurs. Each touch location is determined as previously described.

With both the previous and the current touches known, motion of each touch can be determined, and with a locus of touches, a line can be drawn. For example the motion of touch 1 930 to touch A 935 indicates a motion 950 toward the lower left quadrant of the touch screen 910. Similarly the motion of touch 2 940 to touch B 945 indicates motion 960 toward the upper right quadrant of the touch screen. By comparing the motions lines can be drawn on the touch screen or other functions defined such as expanding details or zooming features.

Figures 10, 10A:
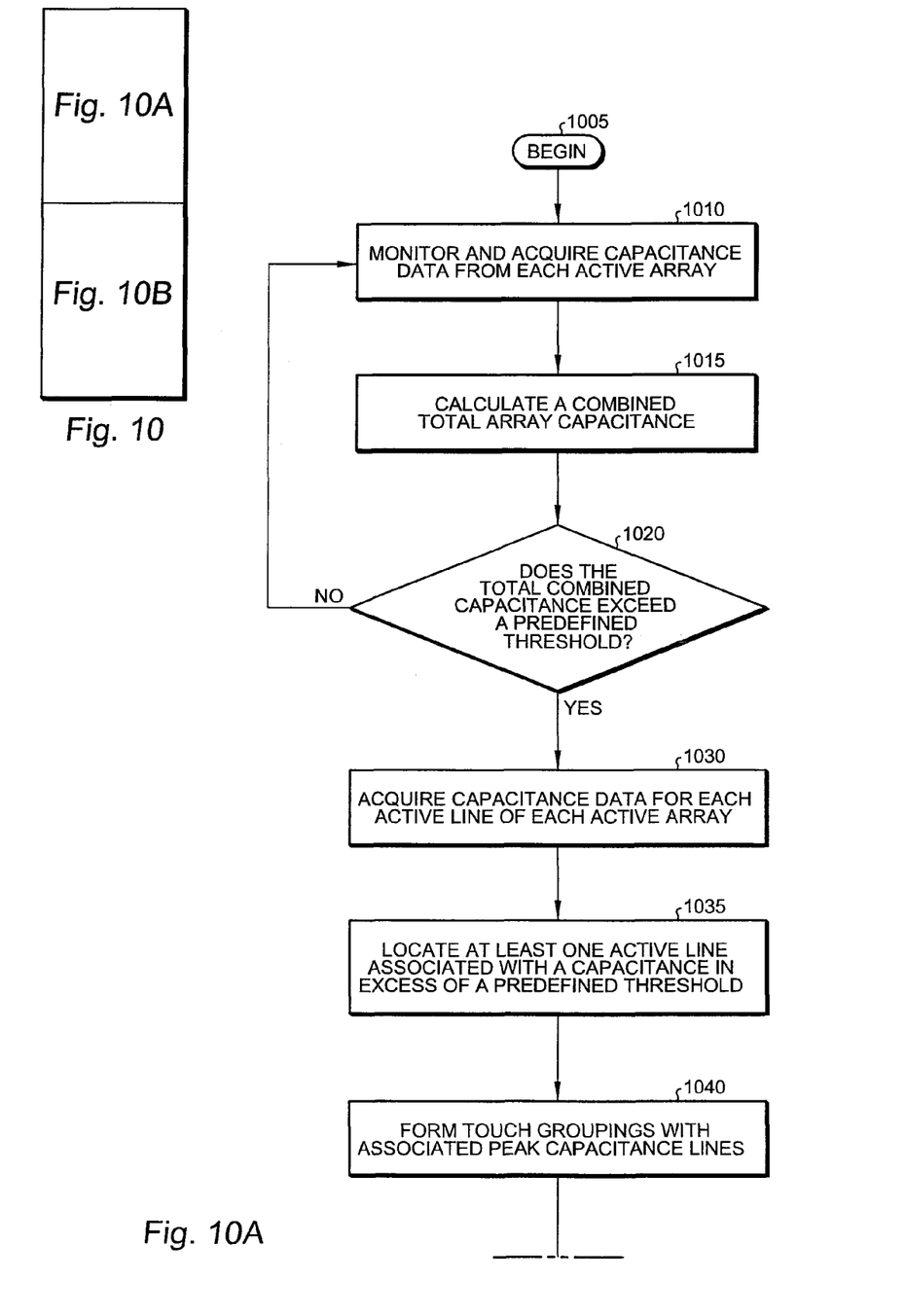
FIG. 10 is a flowchart of one method embodiment for determining dual touch coordinates in a three-dimensional touch screen system, according to the present invention.
Figure 10B:
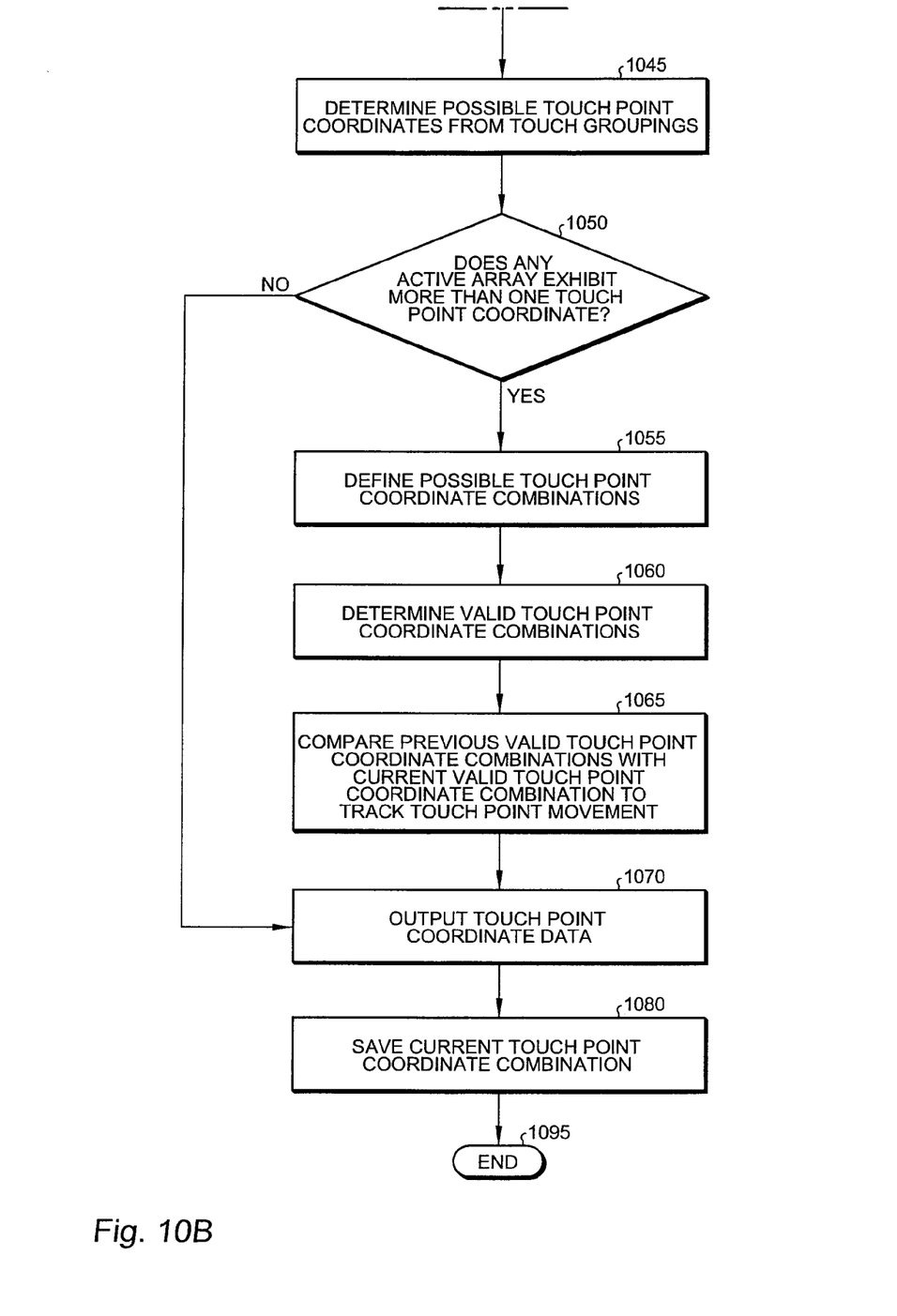

FIG. 10 is a flowchart illustrating methods of implementing an exemplary process for identifying multiple touches in a multi array capacitance based touch screen. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

A method for determining valid or true touch point locations begins 1005 with monitoring and acquiring capacitance data from each active array included in the system. Using the collected data a combined capacitance is calculated 1015 and compared to a predefined threshold. When the total exceeds 1020 the predefined threshold, a touch is declared to have occurred. If the total fails to exceed the threshold, the system continues to monitor total capacitance until circumstances are such that a touch occurs.

With the declaration of a touch occurring, capacitance data from each active array within the system is gained 1030 for further analysis. Within each array active lines whose capacitance level exceeds a predefined threshold and whose capacitance level is greater than both adjacent lines 1035 is identified as a local peak. Once these local peaks are identified, the capacitance values of each adjacent line is compared to the peak value to determine whether the capacitance of the adjacent line is within a predefined range of the local peak. When an adjacent value is within the range, that adjacent line is considered part of the peak channel.

Having identified the peak channel 1035, a touch grouping is formed 1040 by combining lines adjacent to each peak channel. Capacitance values associated with each line of the touch grouping are used to determine 1045 estimated touch points using, according to one embodiment of the present invention, a weighted average statistical analysis. Based on the number of estimated touch points, a determination 1050 is made whether a single or multiple touch point condition exists. When a single touch occurs each array will have only one estimated touch location. However, when any of the active line arrays produce more than one estimated touch point, the system assumes a dual or multiple touch as occurred. Thus in a dual touch situation the above described process will produce for each active line array at least two estimated touch positions.

From the estimated touch points of each array possible touch point coordinate combinations are created 1055. As previously described some of these combinations are ghost or false locations. In a dual touch four possible coordinate combinations exist of which two are false and two are correct. Using a coordinate relationship between the three active arrays, valid touch point coordinates are determined 1060. The valid touch point coordinates are compared to a previously stored set of valid touch point coordinates, and when the new touch points occur within a specific period of time and within a specific window of interest with respect to the previous touch points, touch point tracking can be invoked 1065.

Thereafter the location of the valid touch points is output to a processor, screen or other input/output terminal. As one skilled in the art will recognize the touch screen of the present invention can be coupled with a variety of display and input mechanisms as well as computing systems. Using an underlying screen correlated with the touch screen, data inputs can be gained and results displayed.

Finally the newly defined touch point locations are stored in memory 1080 for touch point tracking purposes ending the process. As one skilled the relevant art will recognize, the data produced by the present invention can be used by any type of microprocessor or similar computing system. In some embodiments, one or more portions of the present invention can implemented in software. Software programming code which embodies the present invention is typically accessed by the microprocessor from long-term storage media of some type, such as a CD-ROM drive or hard drive. The software programming code may be embodied on any of a variety of known media for use with a data processing system, such as a diskette, hard drive, CD-ROM or the like. The code may be distributed on such media, or may be distributed from the memory or storage of one computer system over a network of some type to other computer systems for use by such other systems. Alternatively, the programming code may be embodied in the memory, and accessed by the microprocessor. The techniques and methods for embodying software programming code in memory, on physical media, and/or distributing software code via networks are well known and will not be further discussed herein.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

While there have been described above the principles of the present invention in conjunction with a multiple touch, touch screen device, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A touch pad or touch screen capable of correctly identifying dual-touch inputs comprising:
   a first array of active lines for capacitance measurement;
   a second array of active lines for capacitance measurement wherein the first array and the second array intersect forming a plurality of intersections; and
   a third array of active lines for capacitance measurement wherein active lines of the third array are oriented so as to traverse the plurality of intersections distinct from active lines from the first array and from active lines from the second array,
   wherein correct coordinates of possible combinations from a dual-touch input are identified by comparing coordinate combinations from an expression wherein a first array coordinate is an additive function of a second array coordinate and a third array coordinate.

2. The touch pad or touch screen of claim 1 wherein active lines within each array are parallel.

3. The touch pad or touch screen of claim 2 wherein the first array, the second array and the third array are substantially coplanar and directionally distinct and wherein each of the plurality of intersections includes an active line from each active line array.

4. The touch pad or touch screen of claim 1 further comprising an Nth array of active lines for capacitance measurement for correctly identifying N−1 touch inputs and wherein active lines of the Nth array traverse the intersections distinct from other arrays.

5. The touch pad or touch screen of claim 1 wherein the first array of active lines, second array of active lines and third array of active lines coexist in a first layer that overlays a second layer comprising a plurality of capacitive contacts.

6. The touch pad or touch screen of claim 1 wherein when a location is touched cross-capacitance is reduced and measured by sweeping data along the active lines.

7. The touch pad or touch screen of claim 6 wherein distance between active lines of the first, second and third array is such that when a location is touched at least two active lines detect cross-capacitance reduction.

8. The touch pad or touch screen of claim 1 wherein a touch is determined by a total capacitance exceeding a threshold.

9. The touch pad or touch screen of claim 8 wherein a location of the touch is determined by weighing average capacitance of active lines.

10. A method for multi-touch location identification in a touch pad or touch screen, the method comprising:
    monitoring capacitance of each of a plurality of active lines in three or more active line arrays;
    measuring raised active line capacitance levels indicative of at least one touch;
    identifying one or more possible touch point coordinate combinations based on raised active line capacitance levels from each active line array; and
    determining valid touch point coordinate combinations, wherein correct coordinates of possible combinations from a dual-touch input are identified by comparing coordinate combinations from an expression wherein a first array coordinate is an additive function of a second array coordinate and a third array coordinate.

11. The method of claim 10 wherein determining includes calculating at least one valid capacitance level of a first active line array by combining measured raised active line capacitance levels of a second and third active line array.

12. The method of claim 11 wherein determining includes comparing the at least one valid capacitance level of the first active line array to measured raised active line capacitance levels to ascertain at least one valid touch point coordinate combination.

13. The method of claim 10 further comprising distinctly orientating each of the three or more active line arrays within a single plane to form a plurality of intersections and wherein each of the plurality of intersections includes an active line from each of the three or more active line arrays.

14. The method of claim 13 further comprising arranging the plurality of active lines of the three or more active line arrays to traverse each of the plurality of intersections distinctly.

15. The method of claim 10 further comprising responsive to a sum of active line capacitance of the active line arrays exceeding a threshold, declaring a touch has occurred.

16. The method of claim 15 further comprising calculating a touch position wherein calculating includes;
    locating at least one peak capacitance active line associated with a capacitance peak in each array based on a predefined threshold;
    including neighboring active lines associated with each at least one peak capacitance active line; and
    applying a weighted average calculation of capacitance of included neighboring active lines and the at least one peak capacitance active line to determine possible touch point coordinates for each of the three or more active line arrays associated with each possible touch point coordinate combination.

17. The method of claim 16 wherein the at least one peak capacitance active line includes one or more active lines having a capacitance exceeding the predefined threshold and within a specific capacitance range as measured from the capacitance peak.

18. The method of claim 17 wherein neighboring active lines include active lines adjacent to the at least one peak capacitance active line.

19. The method of claim 18 wherein responsive to determining existence of two or more possible touch point coordinate combinations, ascertaining valid touch point coordinate combinations.

20. The method of claim 19 wherein ascertaining valid touch point coordinate combinations includes comparing calculated touch point coordinates with possible touch point coordinates.

21. The method of claim 10 further comprising comparing previous valid touch point coordinate combinations with current valid touch point coordinate combinations to track touch point movement.

22. In a touch pad or touch screen, a method of correctly identifying dual-touch inputs comprising: providing a first array of active lines for capacitance measurement; providing a second array of active lines for capacitance measurement wherein the first array and the second array intersect forming a plurality of intersections; providing a third array of active lines for capacitance measurement wherein active lines of the third array are oriented so as to traverse the plurality of intersections distinct from active lines from the first array and from active lines from the second array; and identifying correct coordinates of possible combinations from a dual-touch input by comparing coordinate combinations from an expression wherein a first array coordinate is an additive function of a second array coordinate and a third array coordinate.

* * * * *